G. J. EXTERKAMP.
EMERGENCY HORSESHOE.
APPLICATION FILED MAR. 28, 1912.
1,032,475.
Patented July 16, 1912.
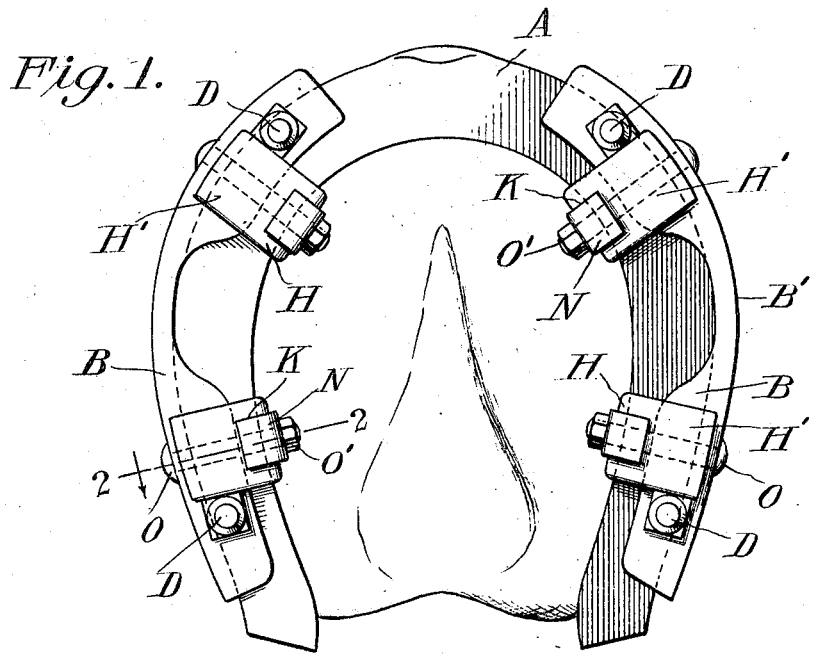
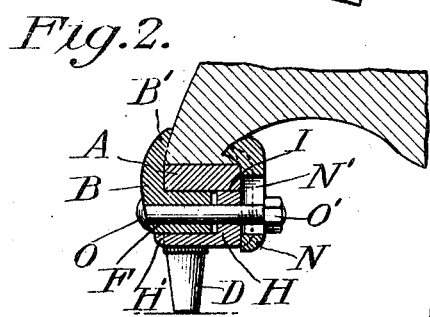
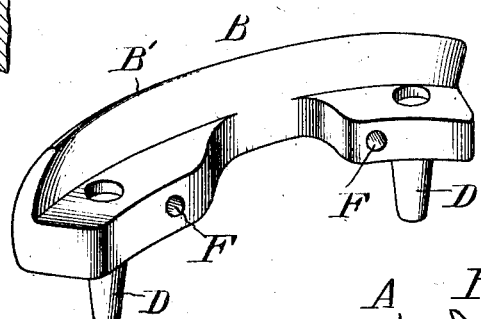
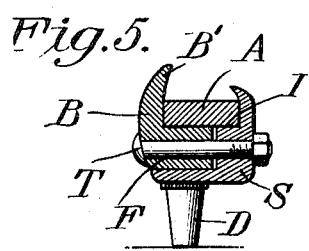
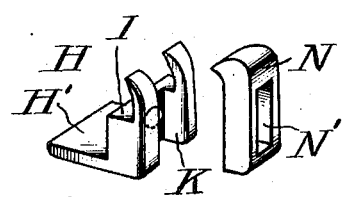
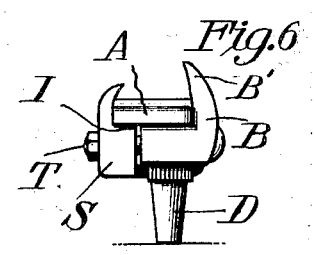
WITNESSES
INVENTOR
George J. Exterkamp

UNITED STATES PATENT OFFICE.

GEORGE J. EXTERKAMP, OF COVINGTON, KENTUCKY, ASSIGNOR OF ONE-HALF TO JOHN A. THOBE, OF COVINGTON, KENTUCKY.

EMERGENCY-HORSESHOE.

1,032,475. Specification of Letters Patent. Patented July 16, 1912.

Application filed March 28, 1912. Serial No. 686,890.

*To all whom it may concern:*

Be it known that I, GEORGE J. EXTERKAMP, a citizen of the United States, residing at Covington, in the county of Kenton and State of Kentucky, have invented certain new and useful Improvements in Emergency-Horseshoes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in emergency horseshoes and comprises essentially a creeper attachment adapted to be fastened to a shoe when upon the hoof of the animal and comprises a simple and efficient device of this nature having various details of construction and combinations and arrangements of parts which will be hereinafter fully described, shown in the accompanying drawings, and then specifically defined in the appended claims.

My invention is illustrated in the accompanying drawings, in which:—

Figure 1 is a bottom view of my invention shown as applied to a horse shoe. Fig. 2 is a sectional view on line 2—2 of Fig. 1. Fig. 3 is a detail perspective view of one of the clamp plates removed from the shoe. Fig. 4 is a detail view of one of the sectional grip blocks which coöperate with the clamping member to hold the latter upon the shoe. Fig. 5 is a sectional view showing a modification, and Fig. 6 is an end view.

Reference now being had to the details of the drawings by letter, A designates a horse shoe and B, B designate creeper or clamp members extending partially the length of the shoe, preferably less than half its length, and each is curved to conform to the curvature of the shoe and has a calk flange B' extending its entire length and terminating at its inner end in a shoulder which contacts with the upper surface of the shoe. Said creeper member is provided with threaded openings for the reception of the removable calks D and is also provided with transverse apertures F. Angular grip blocks, designated by letter H, are provided which have wings H' engaging over the under surface of each clamp or creeper member and each is provided with a shoulder I adapted to rest upon the under surface of the shoe, while the upper end of each grip member is slightly curved and engages over the inner edge of the shoe, as shown clearly in the sectional view of the drawings. Each grip block is provided with a vertical recess K and adjustably held within said recess is a clamping member N, its upper angled end engaging over the upper edge of the shoe and the shank portion of the clamping member N has an elongated slot N' therein through which a bolt O passes which also passes through the registering apertures in the creeper member and also said grip block. A nut O' is fitted to the end of the bolt and bearing against the clamping member N serves to hold the parts securely in place.

In Fig. 5 of the drawings, I have shown a slight modification of the means for holding the creeper or clamping member upon the shoe and which consists of a single grip block S which is of the general shape of the grip block H, and which is held to the creeper member by means of a bolt T. In this form, it will be noted that the auxiliary adjustable clamping member is dispensed with.

By the provision of an emergency horse shoe or creeper made in accordance with my invention, it will be noted that a simple and efficient device is afforded which may be easily and quickly attached to a horse shoe when secured to the hoof of the animal and also removable calks upon the creeper member, thus affording a means for preventing the animal from slipping upon icy roads and pavements.

What I claim to be new is:—

1. An emergency horse shoe comprising a creeper member having a flange and engaging the under face and outer marginal edge of the shoe and apertured, an angled gripping block engaging the inner edge of the horse shoe and under surface of said member, an adjustable clamping member engaging the inner edge of the horse shoe, and a bolt passing through said adjustable clamping member, grip block and creeper member, as set forth.

2. An emergency horse shoe comprising a creeper member having a flange and engaging the under face and outer marginal edge of the shoe and apertured, an angled gripping block engaging the inner edge of the horse shoe and under surface of said member, said block having a recess in the upright portion thereof, a clamping member movable in said recess and adapted to engage the inner edge of the horse shoe, and means for holding said clamping member in an adjustable position, as set forth.

3. An emergency horse shoe comprising a creeper member having a flange and engaging the under face and outer marginal edge of the shoe and apertured, an angled gripping block engaging the inner edge of the horse shoe and under surface of said member, said block having a recess in the upright portion thereof, a clamping member movable in said recess and adapted to engage the inner edge of the horse shoe, and provided with an elongated slot, and a bolt passing through said slot, block and creeper member, as set forth.

In testimony whereof I hereunto affix my signature in the presence of two witnesses.

GEORGE J. EXTERKAMP.

Witnesses:
E. R. RICARD,
CARROL M. NARRARA.